(12) United States Patent
Kurdi et al.

(10) Patent No.: US 12,234,030 B1
(45) Date of Patent: Feb. 25, 2025

(54) SYSTEM AND METHOD OF ARRANGING CARRY-ON LUGGAGE IN OVERHEAD COMPARTMENTS OF PASSENGER VEHICLES

(71) Applicant: King Saud University, Riyadh (SA)

(72) Inventors: Heba Abdullatif Kurdi, Riyadh (SA); Mohannad Yousef Abdulghani, Riyadh (SA)

(73) Assignee: KING SAUD UNIVERSITY, Riyadh (SA)

( * ) Notice: Subject to any disclaimer, the term of this patent is extended or adjusted under 35 U.S.C. 154(b) by 0 days.

(21) Appl. No.: 18/678,909

(22) Filed: May 30, 2024

(51) Int. Cl.
    *B64D 9/00*     (2006.01)
    *B64D 11/00*     (2006.01)

(52) U.S. Cl.
    CPC .............. *B64D 9/00* (2013.01); *B64D 11/003* (2013.01)

(58) Field of Classification Search
    CPC ................................ B64D 9/00; B64D 11/003
    USPC .......................................................... 198/300
    See application file for complete search history.

(56) References Cited

U.S. PATENT DOCUMENTS

| | | | |
|---|---|---|---|
| 3,102,607 A | 9/1963 | Roberts | |
| 3,999,630 A * | 12/1976 | McPhee | B65G 9/002 186/40 |
| 5,159,994 A * | 11/1992 | Luria | B64D 11/0007 186/40 |
| 5,415,250 A | 5/1995 | Rojas | |
| 5,842,668 A * | 12/1998 | Spencer | B64D 11/003 312/246 |
| 6,290,175 B1 * | 9/2001 | Hart | B64D 11/003 244/118.1 |
| 6,899,299 B2 * | 5/2005 | Ritts | B64D 11/003 244/118.5 |
| 6,971,608 B2 | 12/2005 | Harrington et al. | |
| 10,549,855 B2 | 2/2020 | Augustyniak | |
| 10,640,289 B1 | 5/2020 | Roberts | |
| 10,643,294 B2 * | 5/2020 | Murphy | B65G 1/137 |

(Continued)

FOREIGN PATENT DOCUMENTS

| | | | | |
|---|---|---|---|---|
| CN | 106743468 A | | 5/2017 | |
| WO | WO-2011046923 A2 * | | 4/2011 | ............... B64C 1/22 |

(Continued)

*Primary Examiner* — Douglas A Hess
(74) *Attorney, Agent, or Firm* — Nath, Goldberg & Meyer; Joshua B. Goldberg (57) ABSTRACT

The system for handling carry-on luggage in vehicles provides for the storage and retrieval of carry-on luggage in overhead storage bins of passenger vehicles such as airplanes, trains, and buses. A plurality of overhead compartments are mounted within a body of a vehicle and are respectively selectively covered and sealed by a plurality of overhead compartment doors. A plurality of horizontal luggage conveyors are respectively mounted on inner sides of the plurality of overhead compartment doors. Each of the horizontal luggage conveyors includes a plurality of rollers. A vertical luggage conveyor may be used to elevate a piece of luggage from a lower elevation, such as the floor of the vehicle, to a higher elevation, such as the height of the horizontal luggage conveyors. The vertical luggage conveyor may include a platform configured for supporting the piece of luggage and a linear actuator for selectively raising and lowering the platform.

18 Claims, 10 Drawing Sheets

(56) References Cited

U.S. PATENT DOCUMENTS 11,983,657 B2 * 5/2024 Carpenter .......... G05B 19/4155
2006/0022090 A1 2/2006 McCoskey et al.

FOREIGN PATENT DOCUMENTS

WO 2016146175 A1 9/2016
WO 2020032790 A1 2/2020

* cited by examiner

SYSTEM AND METHOD OF ARRANGING CARRY-ON LUGGAGE IN OVERHEAD COMPARTMENTS OF PASSENGER VEHICLES

BACKGROUND

Field

The disclosure of the present patent application relates to storage in vehicles, and particularly to a system for stowing carry-on luggage in overhead compartments of passenger vehicles.

Description of Related Art

Commercial passenger vehicles, such as airplanes, buses and trains, are usually equipped with overhead compartments positioned above passenger seats. Such compartments are used for storing passenger carry-on luggage. Additional storage often exists below the passenger deck but usually requires the luggage to be registered or "checked" with the transportation company, who employ baggage handlers for the routing and transport of such checked luggage.

For carry-on luggage, most commercial airlines allow passengers to bring a small bag, such as a purse or small backpack, which may be placed in a space beneath a seat in front of where the passenger is sitting. A larger piece of carry-on luggage may typically also be brought on board, such as a small suitcase, for example, or a duffle bag. The larger carry-on item is typically placed in an overhead compartment for the duration of the flight so as not to obstruct passengers and staff in the seating areas and aisles. When passengers carry their small and large carry-on luggage items onto an airplane, the walk down the aisle to their assigned seats is a hassle due to the small size of the aisle and the burden of carrying multiple pieces of luggage, which often require the use of both hands.

Due to add-on charges imposed by airlines for checking luggage, many passengers now choose to carry all of their travel belongings within carry-on luggage in order to avoid paying the extra fees required for checked luggage. Some passengers opt to fill their carry-on luggage with all of their travel belongings due to concerns of luggage being mishandled and lost. By placing all their travel items within carry-on luggage, passengers avoid the potential of a baggage handler misplacing or damaging their belongings.

The disadvantage of carrying all travel items within carry-on luggage is the additional weight from the amount of items passengers include in this effort to avoid checking bags. With heavy carry-on items, passengers are forced to navigate through security checkpoints and airplane aisles while pulling or carrying heavy and unwieldy pieces of luggage.

Walking down airplane aisles is particularly burdensome for smaller passengers and passengers seated at the rear of an aircraft. For smaller adults and children who are unable to carry much weight, the experience is not only unpleasant but inhibiting if they are unable to lift their luggage down the length of an aisle or raise their luggage into an overhead compartment. Unfortunately, there are limited solutions to the problem of navigating through airplane aisles for such smaller passengers. Typically, such passengers rely on the help of other passengers or flight attendants to help them carry their bags down an aisle and/or place them in an overhead compartment. However, asking others for such assistance may be undesirable for a number of reasons.

Thus, a system for handling carry-on luggage in vehicles solving the aforementioned problems is desired.

SUMMARY

The system for handling carry-on luggage in vehicles provides for the storage and retrieval of carry-on luggage in overhead storage bins of airplanes, trains, buses and the like. A plurality of overhead compartments are mounted within a body of a vehicle and are respectively selectively covered and sealed by a plurality of overhead compartment doors. A plurality of horizontal luggage conveyors are respectively mounted on inner sides of the plurality of overhead compartment doors. Each of the horizontal luggage conveyors includes a plurality of rollers. Each of the horizontal luggage conveyors may extend horizontally when the overhead compartment door corresponding thereto is in an open position. The plurality of rollers of each of the horizontal luggage conveyors may include at least one motorized roller.

A vertical luggage conveyor may be used to elevate a piece of luggage from a lower elevation, such as the floor of the vehicle, to a higher elevation, such as the height of the horizontal luggage conveyors. The vertical luggage conveyor may include a platform configured for supporting the piece of luggage and a linear actuator for selectively raising and lowering the platform. The platform may be pivotally mounted on the linear actuator.

Additionally, at least one of the overhead compartment doors may include a telescopically extendable stopper. Further, a plurality of luggage ejectors may be respectively mounted within the plurality of overhead compartments. Each of the luggage ejectors may be configured to selectively eject luggage from the corresponding one of the overhead compartments onto the corresponding one of the horizontal luggage conveyors. A scanning system may be provided for scanning a luggage identifier or a passenger boarding pass. An onboard controller may be used to identify one of the overhead compartments based on information obtained from the luggage identifier or the passenger boarding pass.

These and other features of the present subject matter will become readily apparent upon further review of the following specification.

BRIEF DESCRIPTION OF DRAWINGS

Similar reference characters denote corresponding features consistently throughout the attached drawings.

DETAILED DESCRIPTION

Figure 1A:
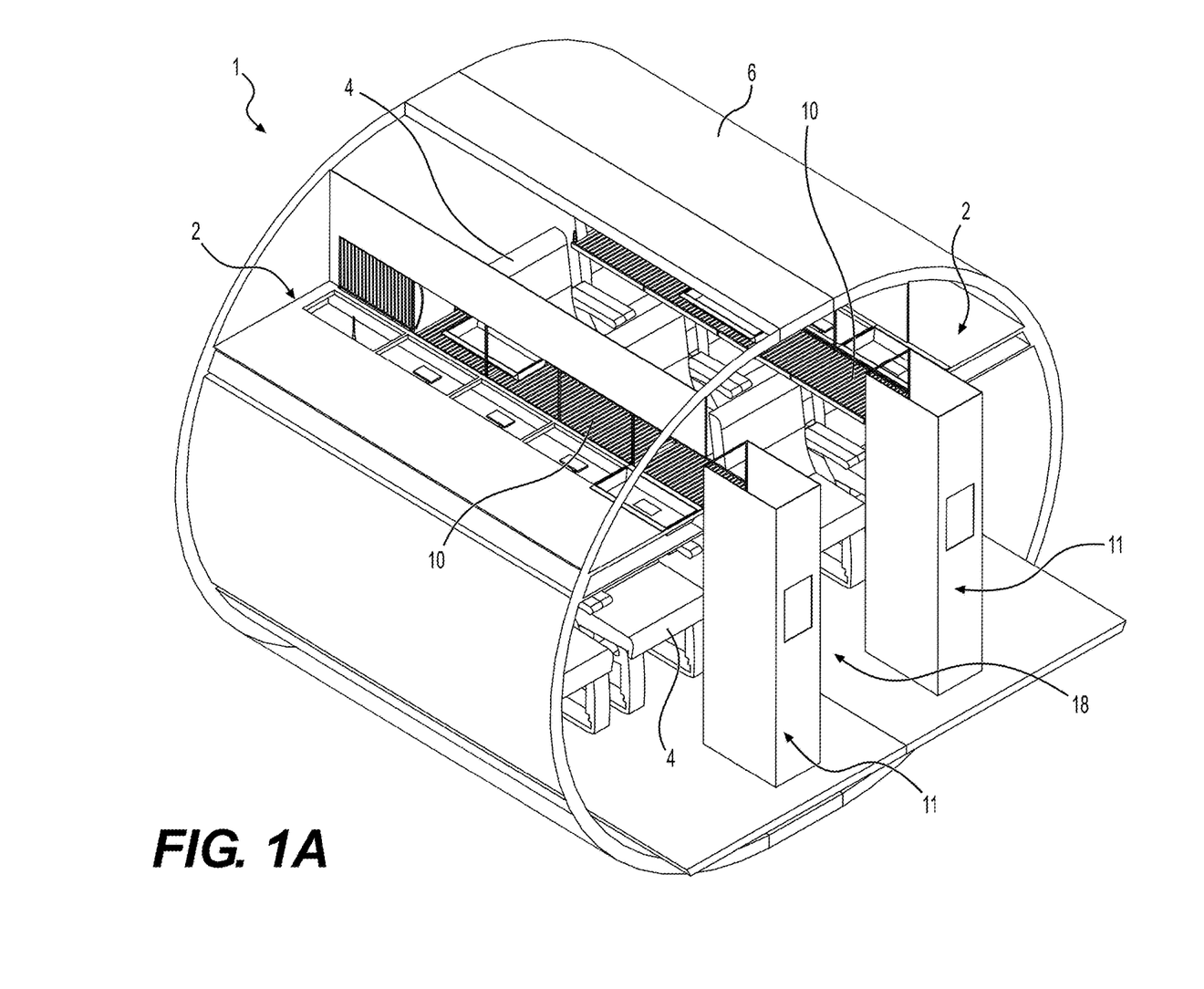
FIG. 1A is a partial perspective view of a system for handling carry-on luggage in vehicles.
Figure 1B:
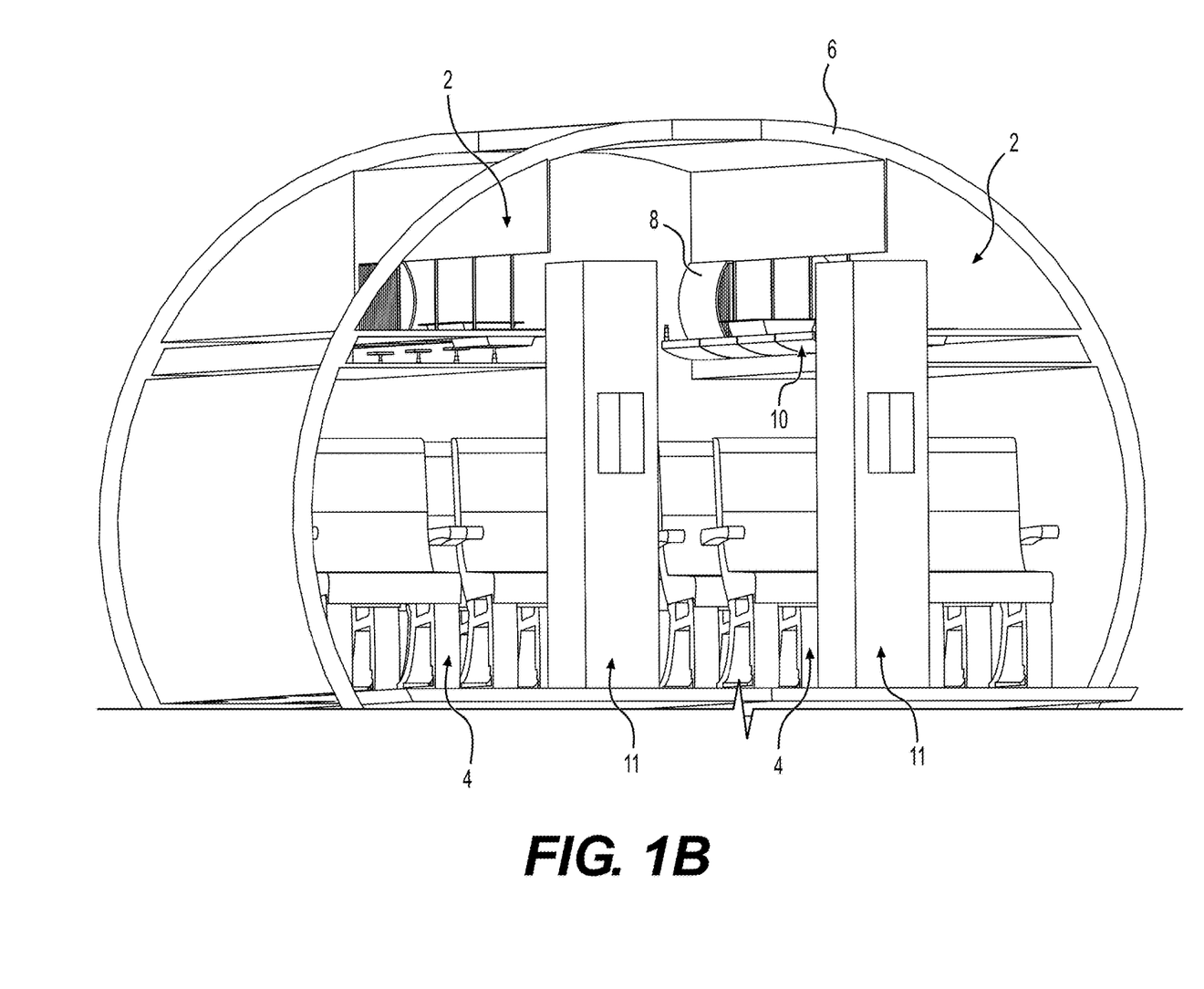
FIG. 1B is a partial perspective view of the system for handling carry-on luggage in vehicles.

FIGS. 1A and 1B show a system 1 for handling carry-on luggage for passenger vehicles. As a non-limiting example, system 1 may be used with a passenger aircraft having overhead luggage compartments. The system 1 includes a plurality of overhead compartments 2 positioned above a plurality of passenger seats 4 along a length of the passenger vehicle 6. It should be understood that although passenger vehicle 6 is shown in FIGS. 1A and 1B as having a configuration similar to a conventional passenger aircraft, system 1 may be used with any other suitable type of vehicles, such as buses, trains, ships and the like. A plurality of overhead compartment doors 8 are included for releasably covering and sealing the overhead storage compartments. As shown, each overhead compartment door 8 may correspond to a respective overhead compartment 2. It should be understood that although FIG. 1B only shows two such overhead compartment doors 8, this is for purposes of illustration and clarity only, and that each overhead compartment 2 will typically have a corresponding overhead compartment door 8. The overhead compartment doors 8 are hinged or otherwise pivoted between an open horizontal position and a closed vertical position. A plurality of horizontal luggage conveyors 10 are further included. The system 1 may include a vertical luggage conveyor 11, as shown, which is configured to elevate a piece of luggage from a lower elevation to a higher elevation, from which the luggage is transferred to the horizontal luggage conveyors 10.

Figure 2A:
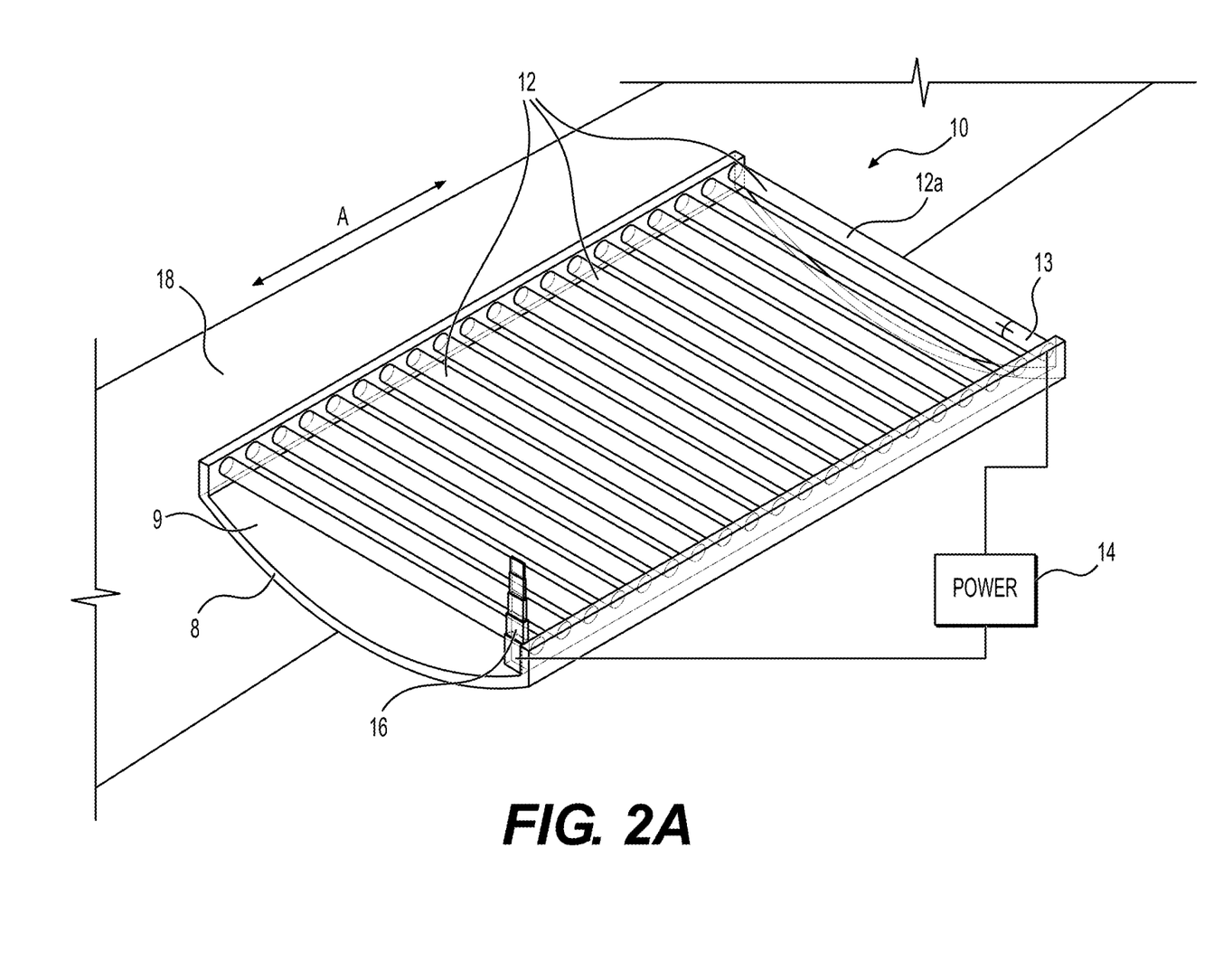
FIG. 2A is a perspective view of a horizontal luggage conveyor of the system for handling carry-on luggage in vehicles.

With reference to FIG. 2A, each of the horizontal luggage conveyors 10 is mounted on an inner side 9 of a corresponding one of the overhead compartment doors 8. Thus, each of the overhead compartment doors 8 has a conveyer 10 installed on its inner side. As shown, each conveyer 10 extends along an axis A, which is parallel to the axis of the vehicle aisle 18. Each conveyer 10 includes a plurality of rollers 12, which may each extend perpendicular to axis A. In a non-limiting embodiment, rollers 12 may include one or more motorized, reversible rollers 12a, driven by a motor 13 and powered by a power source 14. Although FIG. 2A shows only a single motorized roller 12a included in the plurality of rollers 12, it should be understood that any suitable number of non-powered rollers 12 may be replaced by motorized rollers 12a. It should be further understood that any suitable source of power may be used. As a non-limiting example, for conventional airplanes, power source 14 may be one or more of the typical sources of power available, including, but not limited to, the airplane engines, generators, and/or batteries. It should be understood that motors 13 may be coupled with power source 14 by any suitable type of wiring, buses, connectors or the like. Alternatively, power source 14 may include one or more dedicated batteries positioned proximate to the horizontal luggage conveyors 10. It should be understood that system 1 may be powered by power source 14 or by multiple power sources similar to power source 14, including any necessary wiring, couplers, connectors, buses or the like.

As an alternative, it should be understood that the horizontal luggage conveyors 10 may be non-motorized, and allow for manual movement of the luggage thereon by passengers or staff, such as flight attendants or the like, while still providing the convenience of not having to carry luggage through the cramped central aisle 18. As a further alternative, horizontal luggage conveyors 10 may include rollers 12 and at least one reversible motorized roller 12a for driving a belt placed on rollers 12, 12a, thus forming a conventional conveyer belt.

Returning to FIG. 2A, the horizontal luggage conveyors 10 are substantially horizontal (with respect to the floor of the vehicle) and face upwards towards the ceiling when the overhead compartment doors 8 are in an open, horizontal position. One or more of the overhead compartment doors 8 may include a telescopically extendable stopper 16 which may be extended and retracted by, for example, a linear actuator. It should be understood that any suitable type of actuator may be used to selectively extend and retract stopper 16, such as a linear actuator, a telescopic screw drive or the like. Alternatively, the telescopically extendable stopper 16 may be manually extended or spring loaded, such that it is in an extended position when doors 8 are open, and in a retracted position when doors 8 are closed. Doors 8 may be manually closed by passengers or flight attendants or, alternatively, may be fitted with a motorized hinge or the like for automatic closing.

Figure 2B:
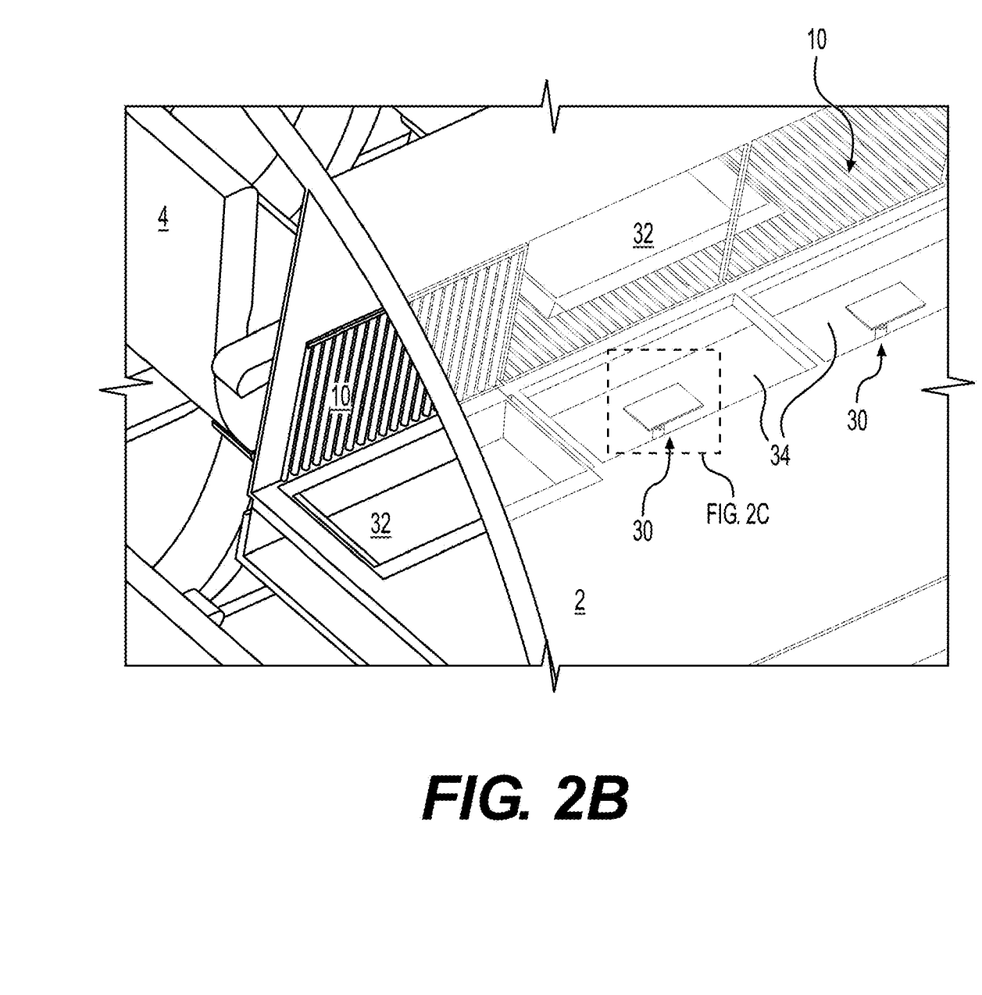
FIG. 2B is a partial perspective view of the system for handling carry-on luggage in vehicles.
Figure 2C:
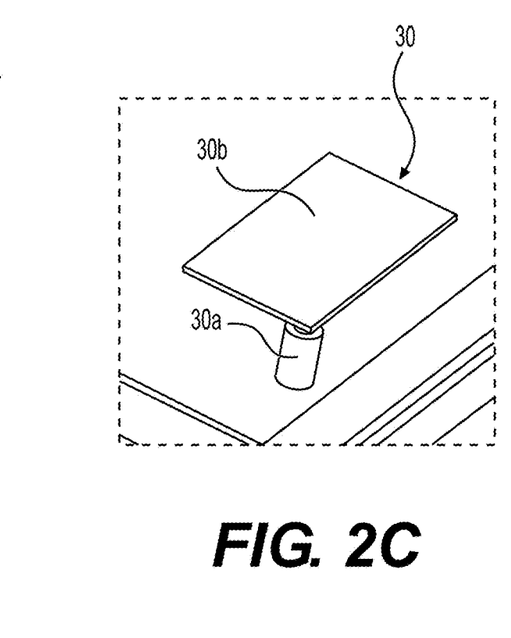
FIG. 2C is perspective view of a luggage ejector of the system for handling carry-on luggage in vehicles.
Figure 2D:
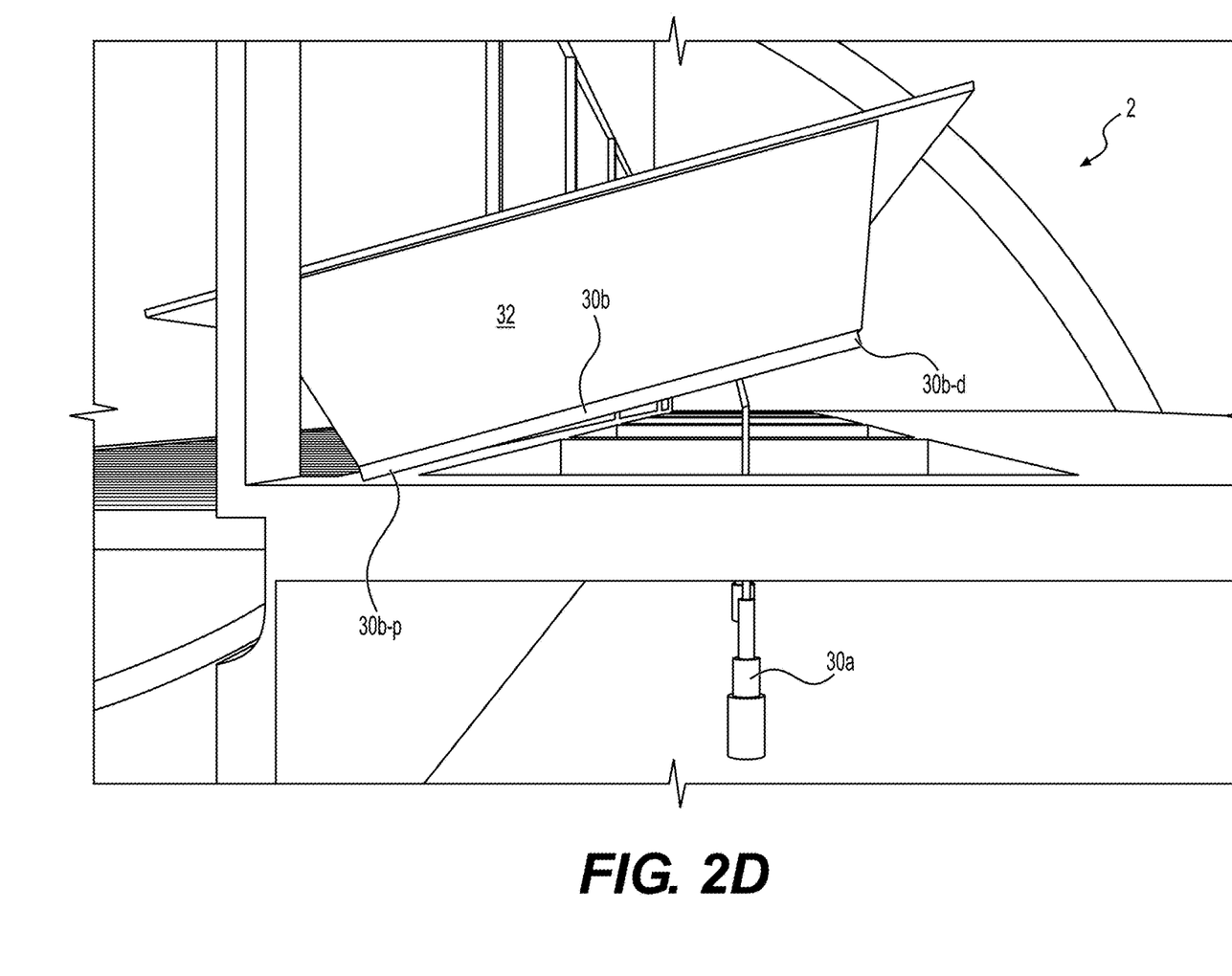
FIG. 2D is a perspective view of the luggage ejector of FIG. 2C in an actuated mode.

Referring to FIGS. 2B-D, system 1 may include a plurality of luggage ejectors 30 positioned within overhead compartments 2 and configured to eject luggage from overhead compartments 2 onto horizontal luggage conveyors 10. Optionally, the system may utilize trays 32 for carrying the various pieces of carry-on luggage. Trays 32 may slide from horizontal luggage conveyors 10 into cavities 34 when horizontal luggage conveyors 10 are moved from an open flat position to a closed, vertical position. In use, when the doors 8 are open, the conveyers 10 associated therewith are horizontal. Trays 32 may be placed thereon and filled with luggage. As the doors 8 are closed, the conveyers 10 formed on the inner sides thereof are raised on one end, creating an inclined plane. Trays 32 slide toward and into cavities 34 under the force of gravity as the doors 8 are closed. Alternatively, cavities 34 may be omitted for a conventional, flat planar surface forming bases of the overhead compartments 2.

As a non-limiting example, each ejector 30 may include a linear actuator 30a, such as a telescoping screw drive or any other suitable type of linear actuator, and an ejector platform 30b supported by linear actuator 30a. Ejectors 30 may be powered by power source 14 or any other suitable source of power aboard the vehicle. Referring to FIG. 2D, ejector platform 30b includes a proximal end 30b-p connected at a hinge point proximate to the horizontal luggage conveyors 10. The linear actuator 30a (in this non-limiting example) is pivotally attached to a distal end 30b-d of platform 30b. Thus, when linear actuator 30a extends upwardly, the ejector platform 30b is pivoted into an angled position (relative to the horizontal), such as that shown in FIG. 2D. In this angled position, trays 32 and/or carry-on luggage will be discharged from overhead compartments 2 onto horizontal luggage conveyors 10 under the force of gravity. Alternatively, ejectors 30 may be positioned in an interior side wall of overhead compartments 2 and extend in a horizontal direction to eject the trays 32 and/or luggage.

Figure 3A:
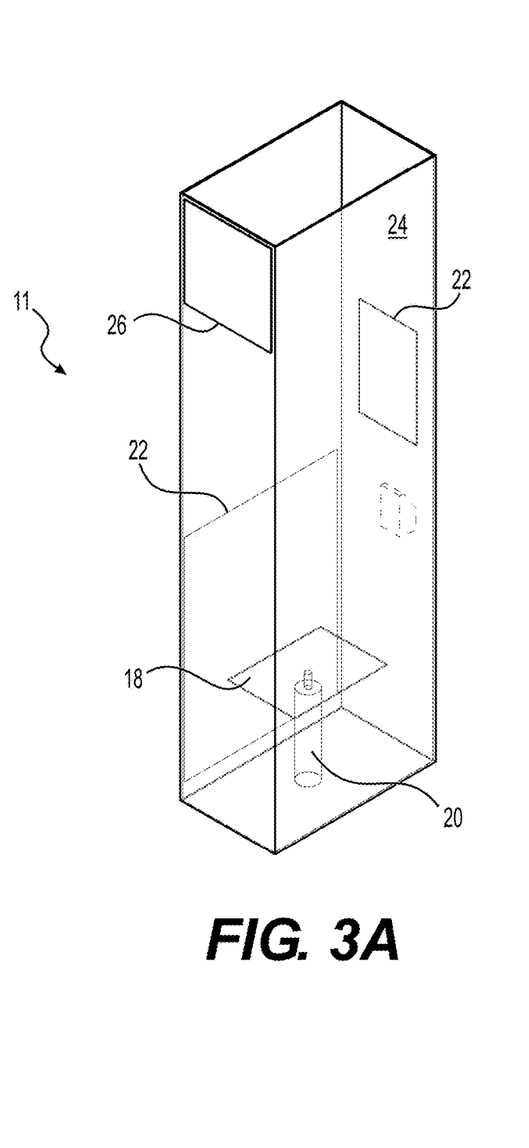
FIG. 3A is a perspective view of a vertical luggage conveyor.
Figure 3B:
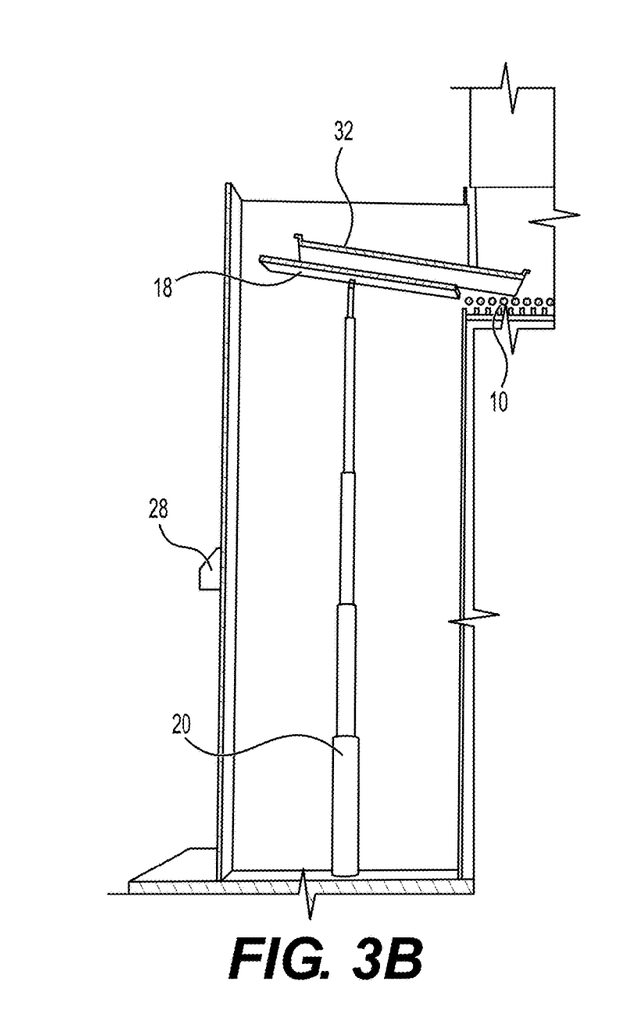
FIG. 3B is a side view of the vertical luggage conveyor.

With reference to FIGS. 3A and 3B, the system 1 may include a vertical luggage conveyor 11 configured to elevate a piece of luggage from a lower elevation to a higher elevation. The vertical luggage conveyor 11 may include a platform 18 for supporting a piece of luggage and a linear actuator 20 selectively raising and lowering the platform 18.

Linear actuator 20 may be a telescoping screw drive or any other suitable type of linear actuator, such as a hydraulic or pneumatic linear actuator (as non-limiting examples). One or more inlet windows 22 may be provided, at a suitable position, within walls 24 for placing luggage onto platform 18 within vertical luggage conveyor 11. An exit window 26 is provided for the transfer of luggage from vertical luggage conveyor 11 to the horizontal luggage conveyors 10. Optionally, a scanning system may be included, such that a scanner 28 may scan a luggage identifier and/or a passenger boarding pass. Scanner 28 may be any suitable type of scanner, such as, but not limited to, a barcode scanner, an RFID scanner, a near-field communication (NFC) sensor or the like.

By scanning a luggage identifier or passenger boarding pass, a location on the vehicle where a passenger is sitting may be identified, such as by section or seat number. The system can then use the luggage identifier or passenger boarding pass to route the piece of luggage to a location on the vehicle in the vicinity of the passenger associated with the piece of luggage.

Figure 3C:
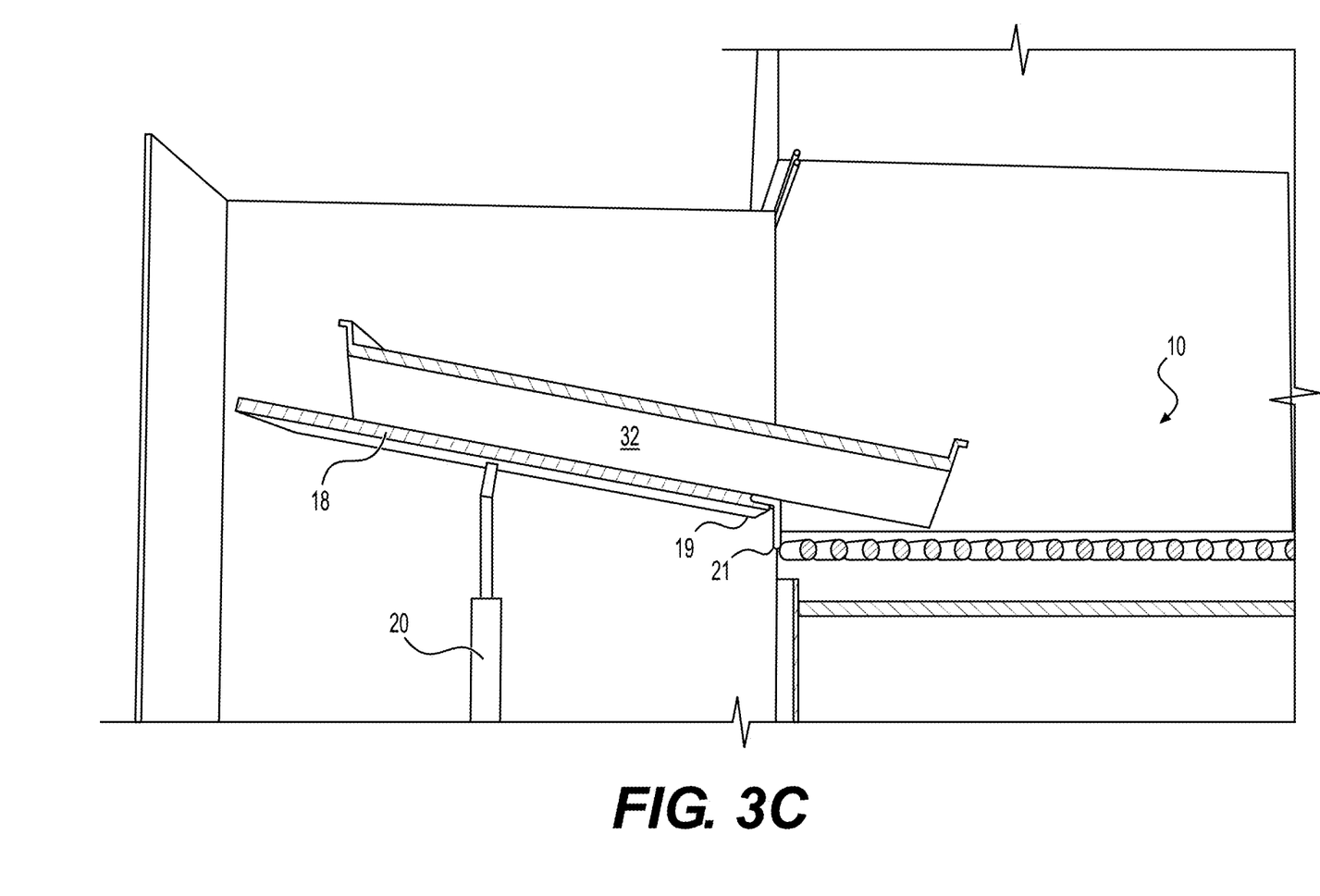
FIG. 3C is a partial side view of the vertical luggage conveyor, shown transferring luggage.

Referring to FIG. 3C, in a non-limiting example, trays 32 and/or carry-on luggage may be transferred from vertical luggage conveyor 11 to horizontal luggage conveyors 10 by titling of platform 18. Platform 18 may include an edge 19 which is adapted for contacting a rim or lip 21 adjacent to the horizontal luggage conveyors 10. Platform 18 may be pivotally mounted on linear actuator 20, such that when the upper end of linear actuator 20 moves above rim or lip 21, platform 18 is pivoted into the angled position shown in FIG. 3C. Thus, tray 32 or a piece of luggage can slide onto the horizontal luggage conveyors 10 under the force of gravity.

Figure 4:
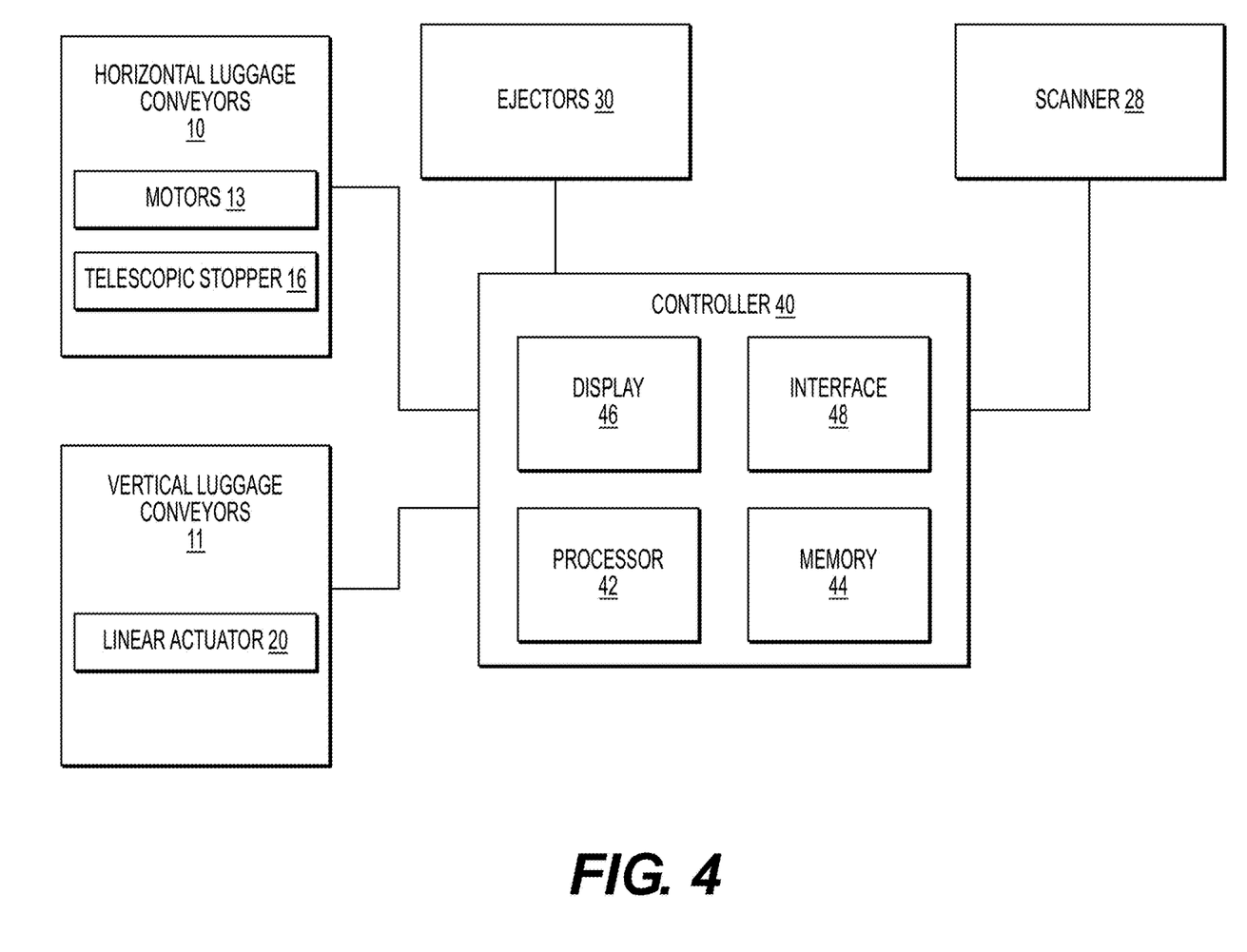
FIG. 4 is a block diagram showing system components of the system for handling carry-on luggage in vehicles.

As shown in FIG. 4, a controller 40 may be in communication with scanner 28 and the various actuators and motors discussed above, including those of the vertical luggage conveyors 11, horizontal luggage conveyors 10, and ejectors 30. Controller 40 is configured to control the system components to synchronize movement of carry-on luggage to the vicinity of a passenger using the information from scanner 28. Controller 40 may be equipped with one or more processors 42, as well as memory components 44, interfaces 48, and displays 46. Examples of the processor 42 may include, but are not limited to, a general purpose processor, a central processing unit (CPU), a microprocessor, a digital signal processor (DSP), a controller, a microcontroller, a state machine, a programmable logic controller, logical control circuitry or the like. The memory components 44 include, but are not limited to, the following non-transitory computer readable media: random access memory (RAM), read-only memory (ROM), non-volatile random access memory (NVRAM), programmable read-only memory (PROM), erasable programmable read-only memory (EPROM), electrically erasable PROM (EEPROM), flash memory, magnetic or optical data storage, or any other suitable type of non-transitory media. Interface 48 may be any suitable type of interface allowing the system components to operate, and may include, but are not limited to, a combination of buttons, switches, touchscreens, keyboards or the like. Display 46 may optionally be included and include any necessary displays or other types of visual indicators for operators of the system, including, but not limited to, computer monitor displays, LED displays, liquid crystal displays, touchscreen displays and the like.

Figure 5A:
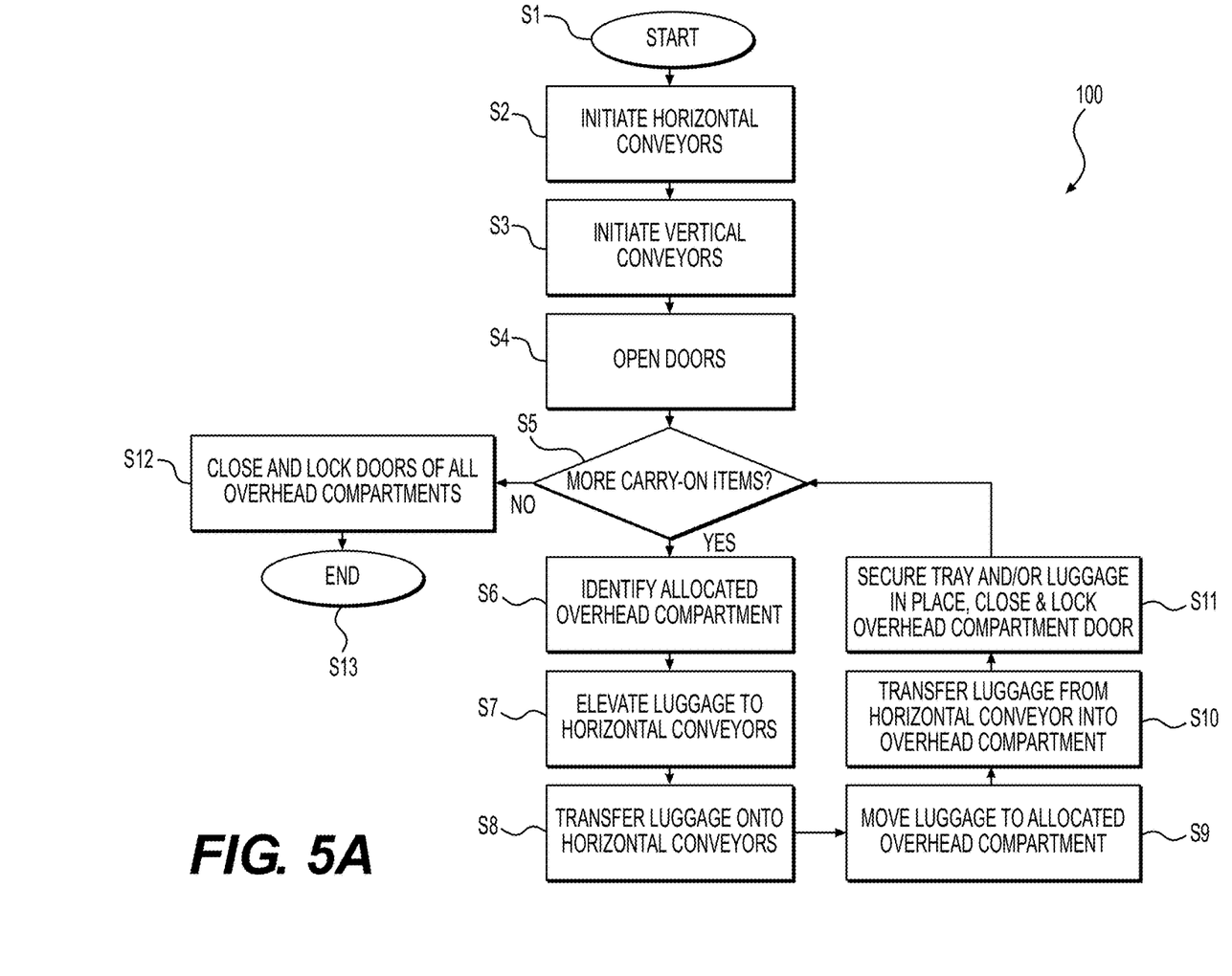
FIG. 5A is a flow chart illustrating a loading sequence for the system for handling carry-on luggage in vehicles.
Figure 5B:
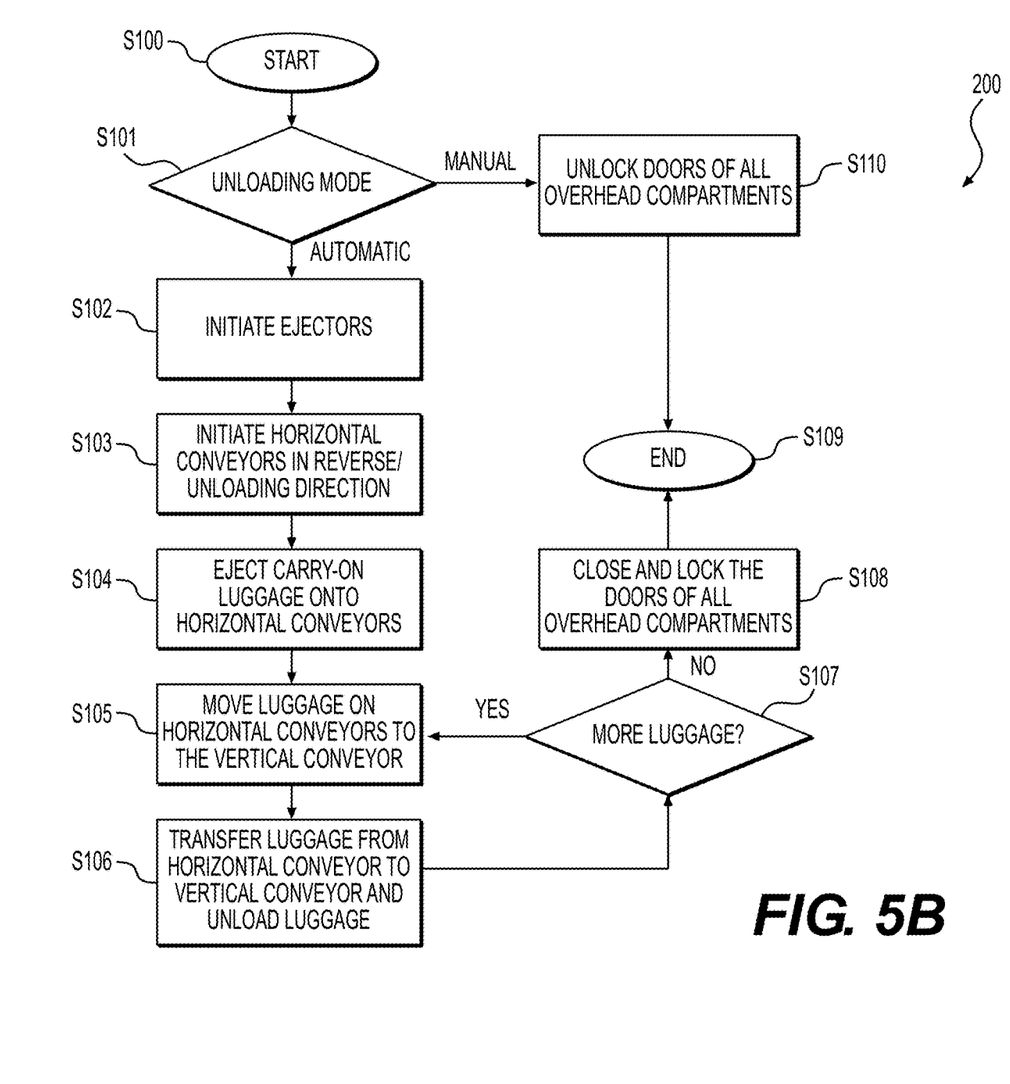
FIG. 5B is a flow chart illustrating an unloading sequence for the system for handling carry-on luggage in vehicles.

Controller 40 may be configured to implement loading and unloading modes 100, 200, respectively, as illustrated in FIGS. 5A and 5B. Referring to FIG. 5A, loading mode 100 begins by initiating the loading mode at step S1, followed by initiating the horizontal luggage conveyors 10 at step S2. In step S3, the vertical luggage conveyors 11 are initiated by the controller 40, followed by step S4, in which all the doors 8 of the overhead compartments 2 are opened. Step S4 may be completed automatically by the controller 40, in the case of the overhead compartment doors 8 fitted with automatic closing/opening hinges. Alternatively, step S4 may be performed manually by the flight staff or the like. In step S5, the system determines whether carry-on luggage remains to be stowed in the overhead compartments 2, and, if so, proceeds to scan pieces of luggage in step S6 to identify allocated overhead compartments for specific pieces of luggage.

After the luggage has been scanned, it is elevated to the height of the horizontal luggage conveyors 10 at step S7, and then transferred to the horizontal luggage conveyors 10 at step S8. While steps S7 and S8 may be performed automatically by the vertical luggage conveyors 11, these may also be performed manually, such as by flight staff or the like. Next, in step S9, the horizontal luggage conveyors 10 are utilized to transfer the luggage to an allocated overhead compartment 2. In step S10, luggage is moved from the horizontal luggage conveyors 10 into the appropriate overhead compartment 2, as identified in step S6. Steps S9 or S10 may be performed automatically by the system or manually by passengers, flight staff or the like, utilizing the rollers 12 of the horizontal luggage conveyors 10. In step S11, the luggage is secured in an overhead compartment 2 and the door 8 for the overhead compartment 2 is closed and locked to secure the luggage. Steps S6-S11 are repeated until no luggage remains, after which any remaining overhead compartment doors are closed in step S12 followed by terminating the loading mode in step S13.

Turning to FIG. 5B, an example unloading mode 200 is illustrated. The unloading mode is initiated in step S100 followed by step S101, where a determination is made whether to unload the carry-on luggage in manual or automatic mode. In manual mode, overhead compartment doors 8 are unlocked in step S110, whereby passengers and staff are permitted to remove their carry-on luggage from the overhead compartments 2 and manually remove them from the vehicle.

In automatic mode, the system initiates the luggage ejectors 30 in step S102, followed by an initiation of the horizontal luggage conveyors 10 at step S103, where the horizontal luggage conveyors 10 are operated in a reverse or unloading direction. At step S104 the luggage is ejected from the overhead compartments 2 onto the horizontal luggage conveyors 10, followed by step S105 in which the luggage is transferred down the horizontal luggage conveyors 10 to the front of the vehicle to the vertical luggage conveyors 11. In step S106, the luggage is transferred from the horizontal luggage conveyors 10 to the vertical luggage conveyors 11 and lowered to the passenger level where it is unloaded by a deboarding passenger or staff members. Steps S105 and S106 are repeated until all carry-on luggage has been removed from the overhead compartments 2, as determined in step S107. Once all overhead compartments 2 are empty, the overhead compartment doors 8 are closed in step S108 followed by a termination of the unloading mode in step S109.

While specific loading 100 and unloading 200 modes have been described, these methods are non-limiting examples only, and may be modified within the spirit of the disclosure set forth herein. For example, trays 32 may be used for the conveyance of luggage during the loading and unloading phases. Some elements of the loading and unloading modes 100, 200 may be performed manually by passengers and staff, as previously explained, and some parts of the system may be optional or omitted.

It is to be understood that the system for handling carry-on luggage in vehicles disclosed is not limited to the specific embodiments described above, but encompass any and all embodiments within the scope of the generic language of the following claims enabled by the embodiments described herein, or otherwise shown in the drawings or described above in terms sufficient to enable one of ordinary skill in the art to make and use the claimed subject matter.

The invention claimed is:

1. A system for handling carry-on luggage in vehicles, comprising:
    a plurality of overhead compartments within a body of a vehicle;
    a plurality of overhead compartment doors for respectively selectively covering and sealing the plurality of overhead compartments, wherein at least one of the plurality of overhead compartment doors includes a telescopically extendable stopper; and
    a plurality of horizontal luggage conveyors respectively mounted on inner sides of the plurality of overhead compartment doors, wherein each of the horizontal luggage conveyors comprises a plurality of rollers.

2. The system for handling carry-on luggage in vehicles as recited in claim 1, further comprising a vertical luggage conveyor configured to elevate a piece of luggage from a lower elevation to a higher elevation.

3. The system for handling carry-on luggage in vehicles as recited in claim 2, wherein the vertical luggage conveyor comprises:
    a platform configured for supporting the piece of luggage; and
    a linear actuator for selectively raising and lowering the platform.

4. The system for handling carry-on luggage in vehicles as recited in claim 3, wherein the platform is pivotally mounted on the linear actuator.

5. The system for handling carry-on luggage in vehicles as recited in claim 1, wherein each of the horizontal luggage conveyors extends horizontally when the overhead compartment door corresponding thereto is in an open position.

6. The system for handling carry-on luggage in vehicles as recited in claim 1, wherein the plurality of rollers of each of the horizontal luggage conveyors comprise at least one motorized roller.

7. The system for handling carry-on luggage in vehicles as recited in claim 1, further comprising a plurality of luggage ejectors respectively mounted within the plurality of overhead compartments, wherein each of the luggage ejectors is configured to selectively eject luggage from the corresponding one of the overhead compartments onto the corresponding one of the horizontal luggage conveyors.

8. The system for handling carry-on luggage in vehicles as recited in claim 1, further comprising a scanning system configured to scan a luggage identifier or a passenger boarding pass.

9. The system for handling carry-on luggage in vehicles as recited in claim 8, further comprising a controller configured to identify one of the overhead compartments based on information obtained from the luggage identifier or the passenger boarding pass.

10. A system for handling carry-on luggage in vehicles, comprising:
    a plurality of overhead compartments within a body of a vehicle;
    a plurality of overhead compartment doors for respectively selectively covering and sealing the plurality of overhead compartments; and
    a plurality of horizontal luggage conveyors respectively mounted on inner sides of the plurality of overhead compartment doors, wherein each of the plurality of horizontal luggage conveyors comprises a plurality of rollers; and
    further comprising a plurality of luggage ejectors respectively mounted within the plurality of overhead compartments, wherein each of the plurality of luggage ejectors is configured to selectively eject luggage from the corresponding one of the plurality of overhead compartments onto the corresponding one of the plurality of horizontal luggage conveyors.

11. The system for handling carry-on luggage in vehicles as recited in claim 10, further comprising a vertical luggage conveyor configured to elevate a piece of luggage from a lower elevation to a higher elevation.

12. The system for handling carry-on luggage in vehicles as recited in claim 11, wherein the vertical luggage conveyor comprises:
    a platform configured for supporting the piece of luggage; and
    a linear actuator for selectively raising and lowering the platform.

13. The system for handling carry-on luggage in vehicles as recited in claim 12, wherein the platform is pivotally mounted on the linear actuator.

14. The system for handling carry-on luggage in vehicles as recited in claim 10, wherein each of the plurality of horizontal luggage conveyors extends horizontally when the overhead compartment door corresponding thereto is in an open position.

15. The system for handling carry-on luggage in vehicles as recited in claim 10, wherein at least one of the plurality of overhead compartment doors includes a telescopically extendable stopper.

16. The system for handling carry-on luggage in vehicles as recited in claim 10, wherein the plurality of rollers of each of the plurality of horizontal luggage conveyors comprise at least one motorized roller.

17. The system for handling carry-on luggage in vehicles as recited in claim 10, further comprising a scanning system configured to scan a luggage identifier or a passenger boarding pass.

18. The system for handling carry-on luggage in vehicles as recited in claim 10, further comprising a controller configured to identify one of the plurality of overhead compartments based on information obtained from the luggage identifier or the passenger boarding pass.

* * * * *